(12) United States Patent
Runyan

(10) Patent No.: US 7,946,468 B2
(45) Date of Patent: *May 24, 2011

(54) FRICTION WELDED STRUCTURAL ASSEMBLY AND PREFORM AND METHOD FOR SAME

(75) Inventor: Max R. Runyan, Huntingdon Beach, CA (US)

(73) Assignee: The Boeing Company, Chicago, IL (US)

( * ) Notice: Subject to any disclaimer, the term of this patent is extended or adjusted under 35 U.S.C. 154(b) by 987 days.

This patent is subject to a terminal disclaimer.

(21) Appl. No.: 11/376,765

(22) Filed: Mar. 16, 2006

(65) Prior Publication Data

US 2006/0255098 A1 Nov. 16, 2006

Related U.S. Application Data

(60) Division of application No. 10/781,419, filed on Feb. 18, 2004, now Pat. No. 7,048,175, which is a continuation-in-part of application No. 10/742,325, filed on Dec. 19, 2003, now abandoned.

(51) Int. Cl.
 *B23K 20/12* (2006.01)
(52) U.S. Cl. ..................................... 228/112.1
(58) Field of Classification Search ............... 228/112.1, 228/2.1, 157
 See application file for complete search history.

(56) References Cited

U.S. PATENT DOCUMENTS

| | | | |
|---|---|---|---|
| 3,332,134 A * | 7/1967 | Denis et al. | 228/157 |
| 3,779,446 A * | 12/1973 | Lemelson | 228/15.1 |
| 3,857,010 A * | 12/1974 | Nishio et al. | 219/61 |
| 3,927,817 A | 12/1975 | Hamilton et al. | |
| 4,181,000 A | 1/1980 | Hamilton et al. | |
| 4,217,397 A | 8/1980 | Hayase et al. | |
| 4,304,821 A | 12/1981 | Hayase et al. | |
| 4,603,089 A | 7/1986 | Bampton | |
| 4,622,445 A | 11/1986 | Matsen | |
| 4,811,890 A | 3/1989 | Dowling et al. | |
| 5,139,887 A * | 8/1992 | Sutton | 428/586 |
| 5,236,525 A * | 8/1993 | Anton | 148/564 |
| 5,366,787 A * | 11/1994 | Yasui et al. | 428/174 |
| 5,420,400 A | 5/1995 | Matsen | |
| 5,460,317 A | 10/1995 | Thomas et al. | |
| 5,700,995 A * | 12/1997 | Matsen | 219/615 |
| 5,758,999 A | 6/1998 | Geise | |
| 5,971,247 A | 10/1999 | Gentry | |
| 5,994,666 A | 11/1999 | Buldhaupt et al. | |
| 6,051,325 A | 4/2000 | Talwar et al. | |
| 6,102,636 A | 8/2000 | Geise | |
| 6,180,932 B1 | 1/2001 | Matsen et al. | |
| 6,199,745 B1 | 3/2001 | Campbell et al. | |
| 6,364,197 B1 | 4/2002 | Oelgoetz et al. | |
| 6,450,395 B1 | 9/2002 | Weeks et al. | |
| 6,537,682 B2 | 3/2003 | Colligan | |
| 6,566,635 B1 | 5/2003 | Matsen et al. | |
| 6,568,582 B2 * | 5/2003 | Colligan | 228/112.1 |

(Continued)

*Primary Examiner* — Jessica L Ward
*Assistant Examiner* — Steven Ha
(74) *Attorney, Agent, or Firm* — Alston & Bird LLP

(57) ABSTRACT

Expanded structural assemblies and preforms and methods therefor are provided. Each preform can include at least two structural members in a stacked relationship, defining cells that can be inflated to expand the preform. Elongate members can be disposed between the structural members along the cells to define passages through which fluid can be received during expanding. Further, the structural members of the preform can be connected by friction stir weld joints, some of which can extend only partially through the preform so that the preform defines cells that can be expanded. More than one adjacent friction stir weld joint can be disposed between adjacent cells of the preform to define multiple-pass friction stir weld joints.

17 Claims, 4 Drawing Sheets

U.S. PATENT DOCUMENTS

| | | | |
|---|---|---|---|
| 6,852,273 B2 * | 2/2005 | Ivanov et al. | 419/5 |
| 7,048,175 B2 * | 5/2006 | Runyan | 228/112.1 |
| 7,090,112 B2 * | 8/2006 | Masingale | 228/112.1 |
| 7,210,610 B2 * | 5/2007 | Nelson et al. | 228/2.1 |
| 2005/0136282 A1 * | 6/2005 | Morales et al. | 428/613 |
| 2006/0013645 A1 * | 1/2006 | Ilyushenko et al. | 403/270 |

* cited by examiner

FRICTION WELDED STRUCTURAL ASSEMBLY AND PREFORM AND METHOD FOR SAME

CROSS-REFERENCES TO RELATED APPLICATIONS

This application is a divisional application of U.S. application Ser. No. 10/781,419, filed on Feb. 18, 2004, which issued as U.S. Pat. No. 7,048,175, which is a continuation-in-part of U.S. patent application Ser. No. 10/742,325, filed on Dec. 19, 2003, now abandoned, each of which is hereby incorporated herein in its entirety by reference.

BACKGROUND OF THE INVENTION

1) Field of the Invention

The present invention relates to expanded structural assemblies and, more particularly, to an expanded structural assembly joined with a plurality of friction weld joints and to preforms and methods for forming such structural assemblies.

2) Description of Related Art

Expanded structural assemblies, and particularly honeycomb panels, are used in a variety of applications in the aerospace industry including, for example, flight control surfaces, acoustic suppression panels, aircraft flooring, other aircraft structural components, and the like. In addition, such expanded structural assemblies are also used in a variety of other industries and applications, including as structural members for automobiles and other vehicles. Honeycomb panels and other expanded structural assemblies advantageously provide a combination of high stiffness and low weight as compared to conventional panels formed from a solid material.

Conventional metal bonded aerospace honeycomb panels are produced by welding or brazing thin "foil like" core sheets to thicker outboard face sheets in a flat configuration. The resulting flat aerospace honeycombs can be used as flat structural panels or further creep-stretch formed into slightly curved shapes.

U.S. Pat. No. 6,537,682 to Colligan, titled "Application of Friction Stir Welding to Superplastically Formed Structural Assemblies," describes a structural assembly formed by friction stir welding multiple structural members and thereafter superplastically forming the members to form the expanded assembly. The assembly can be formed by inflating the structural members in a die so that the assembly is formed to the shape of the die. The facing surfaces of the structural members can be partially covered with oxide to prevent undesired thermo-compressing welding from occurring adjacent the friction stir weld joints.

Although the methods of the prior art have proven successful in forming expanded structural assemblies, there exists a continued need for an improved expanded structural assembly and methods and preforms for forming the same. Preferably, the method should be capable of forming expanded structural assemblies of various shapes. Further, the structural assemblies should provide consistent expanding of the cells of the assemblies so that the assemblies are formed to the desired shape.

BRIEF SUMMARY OF THE INVENTION

The present invention provides a method for forming preforms and expanded structural assemblies therefrom. The preforms can include at least two structural members in a stacked relationship with elongate members disposed therebetween and extending generally along a path of at least one cell of the structural assembly and defining a passage through which fluid can be received during expanding of the cells. Further, the structural members of the preform can be connected by friction stir weld joints, some of which can extend only partially through the preform so that the preform defines cells that can be expanded.

According to one embodiment of the present invention, one or more core members can be positioned between first and second face members, and the face members can be friction welded to the core members with a friction welding tool that partially penetrates the core members. For example, the members can be friction stir welded with a rotating welding tool. If multiple core members are provided, friction stir weld joints can be formed entirely within the core members, and elongate members can be disposed between the core members to extend generally along the paths of the cells. A periphery of the preform can also be friction welded with a tool that at least partially penetrates both of the face members. The periphery can be welded to define at least one fluid inlet in fluid connection with the cells.

At least two adjacent friction weld joints can be formed between adjacent cells, and the adjacent friction weld joints can have a combined width that is greater than a thickness of each of the structural members. The preform can be inflated by expanding the cells, e.g., to six-sided shapes that extend in a longitudinal direction so that the cells of the structural assembly define a honeycomb configuration. The preform can be expanded in a die cavity that defines a contour surface corresponding to a desired contour of the structural assembly so that expanding the cells urges the structural members outward against the die cavity. The contour surface can define a complex curve so that the structural assembly is formed to define the complex curve of the contour surface. According to one aspect of the invention, the preform is heated to a superplastic forming temperature such that the preform is superplastically formed during said inflating step. After inflating the preform, the resulting structural assembly can be quenched by circulating a coolant fluid therethrough. Alternatively, the preform can be cold stretch formed to the desired shape. The elongate members can also be removed from the structural assembly.

The present invention also provides a friction welded preform and an expanded structural assembly formed therefrom. The preform includes at least two structural members in a stacked relationship. The structural members can be formed of materials such as aluminum and aluminum alloys. A plurality of friction weld joints connect the structural members so that the structural members define at least one cell between the friction weld joints. A weld joint also extends at least partially around a periphery of the structural members and defines a fluid inlet fluidly connected to each cell so that the preform can be expanded by a pressurized fluid that is injected through the fluid inlet and into the cells. At least one elongate member can be disposed between the structural members of the preform so that the elongate member extends generally along a path of each cell and maintains a passage between the structural members.

The preform and structural assembly can include first and second face members with at least one core member therebetween, and the elongate member can be disposed between the core members and each of the first and second face members. A first of the friction weld joints can extend between the first face member and at least a portion of the core member, and a second friction weld joint can extend between the second face member and at least a portion of the core member so that the first friction weld joint can be inflated away from the second face member and the second friction weld joint can be inflated away from the first face member. Further, the preform and structural assembly can include a plurality of core members, and some of the friction weld joints can be disposed entirely between the core members such that the face members are configured to be inflated away from the core members. According to one aspect of the invention, the preform and the structural assembly define at least two adjacent friction weld joints between adjacent cells. The adjacent friction weld joints can have a combined width that is greater than a thickness of each of the structural members. At least one side of each cell of the structural assembly can be defined by the friction weld joints.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
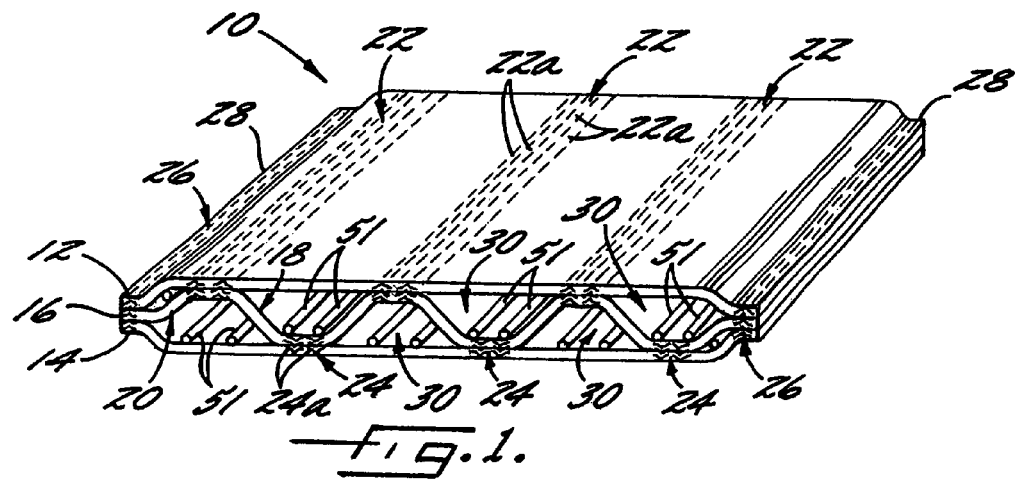
FIG. 1 is a perspective view illustrating an expanded structural assembly formed according to one embodiment of the present invention.

Referring now to the drawings and, in particular, FIG. 1, there is illustrated an expanded structural assembly 10 according to one embodiment of the present invention. The structural assemblies 10 formed according to the present invention can be used in a variety of applications and structures, including aerospace applications such as flight control surfaces, acoustic suppression panels, aircraft flooring structures, other aircraft structural components, and the like. Alternatively, the structural assemblies 10 can be used in a variety of other industries and applications, including as structural members for automobiles, watercraft, other vehicles, building structures, and the like.

The structural assembly 10 illustrated in FIG. 1 includes three structural members 12, 14, 16 and, in particular, a first face member 12, a second face member 14, and a core member 16 disposed therebetween so that first and second sides 18, 20 of the core member 16 are directed toward the first and second face members 12, 14, respectively. The structural members 12, 14, 16 are connected by weld joints 22, 24, 26 such as friction stir weld joints that extend partially or completely through the structural members 12, 14, 16. In particular, first weld joints 22 connect the first face member 12 to the core member 16, and second weld joints 24 connect the second face member 14 to the core member 16. A peripheral weld joint 26, connecting all of the structural members 12, 14, 16, extends around a peripheral portion 28 of the members 12, 14, 16. The structural assembly 10 defines cells 30 between the members 12, 14, 16 and between the weld joints 22, 24, 26.

Figure 2:
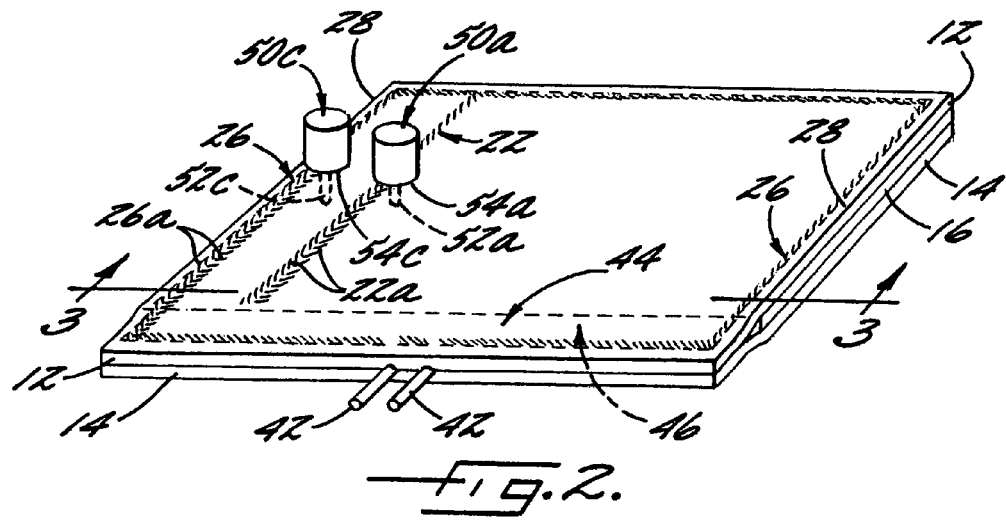
FIG. 2 is a perspective view illustrating the structural members of a preform for forming the structural assembly of FIG. 1.
Figure 3:
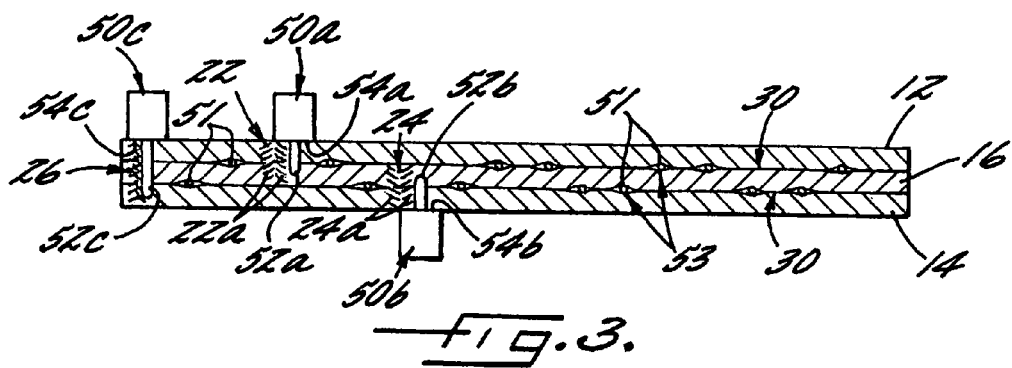
FIG. 3 is a section view illustrating the structural members of FIG. 2 as seen along line 3-3 of FIG. 2.

Each of the weld joints 22, 24, 26 can be formed by various welding processes, such as friction stir welding. For example, FIGS. 2 and 3 illustrate the structural members 12, 14, 16 during formation of a preform 40 (FIG. 4) that is subsequently used to form the structural assembly 10. The first and second friction weld joints 22, 24 are formed by friction stir welding devices 50a, 50b having rotatable pins 52a, 52b that are configured to partially penetrate the structural members 12, 14, 16. For example, the first friction stir welding device 50a defines a shoulder 54a and the pin 52a extending therefrom. The shoulder 54a and pin 52a are rotated by a rotary actuator (not shown), and the pin 52a is urged into the structural members 12, 16. The pin 52a is configured to extend through the first face member 12 and at least partially through the core member 16. The welding device 50a is then urged in a predetermined path along the structural members 12, 14, 16 to form the first friction stir weld joints 22, which join the first face member 12 and the core member 16, without joining those members 12, 16 to the second face member 14. Similarly, the second friction stir welding device 50b has a shoulder 54b urged against the second face member 14 so that the pin 52b extends through the second face member 14, thereby forming the second friction stir welding joints 24 that extend at least partially through the core member 16 to join the second face member 14 and the core member 16 without joining those members 14, 16 to the first face member 12. A third friction stir welding device 50c has a pin 52c that is structured to extend at least partially through each of the structural members 12, 14, 16 so that the resulting joint 26 at the periphery of the members 12, 14, 16 is a full-penetration joint which joins all of the members 12, 14, 16. While separate friction stir welding devices 50a, 50b, 50c are illustrated in FIGS. 2 and 3, it is appreciated that each of the weld joints 22, 24, 26 can be formed using a single welding device, e.g., a welding device with an adjustable pin or shoulder to penetrate the members 12, 14, 16 to a selective depth as required. Friction welding is further described in U.S. Pat. No. 5,460,317 to Thomas, et al.

Each friction stir welding device 50a, 50b, 50c can be used to form a plurality of the friction stir weld joints 22, 24, 26, and each of the weld joints 22, 24, 26 can be a multiple-pass weld joint comprised of multiple single-pass weld connections 22a, 24a, 26a that are disposed adjacent one another so that each of the weld joints 22, 24, 26 has a combined width that is greater than a width of each of the individual connections 22a, 24a, 26a. For example, as shown in FIGS. 2 and 3, the first and second welding devices 50a, 50b can be urged along multiple adjacent paths so that the resulting multiple-pass weld joints 22, 24 have widths that are each approximately equal to the sum of the widths of the adjacent weld connections 22a, 24a, respectively. Advantageously, the combined width of the weld joints 22, 24, 26 can be made as wide as desired, regardless of constraints on the width of the pins 52a, 52b, 52c and the width of each individual weld connection 22a, 24a, 26a. In some cases, the width of the weld joints 22, 24, 26 can be wider than the thickness of the structural members 12, 14, 16 that are being welded, and/or as wide as one side of the cells 30. In some cases, the width of the weld joints 22, 24, 26 can be wider than the thickness of the structural members 12, 14, 16 that are being welded, and/or as wide as one side of the cells 30.

Figure 4:
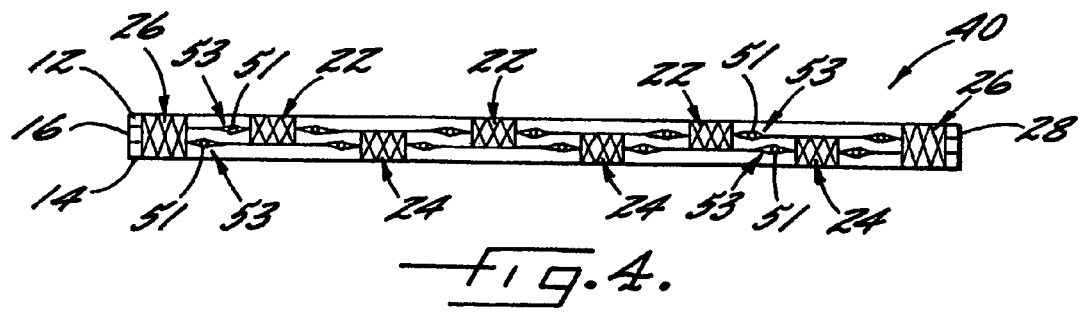
FIG. 4 is a section view illustrating the preform for forming the structural members of FIG. 1.
Figure 4A:
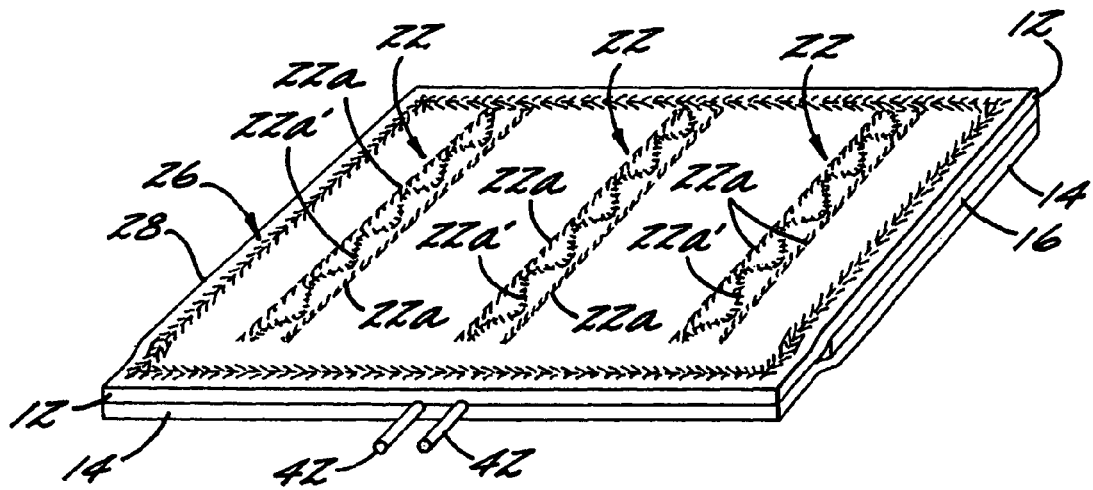
FIG. 4A is a perspective view illustrating a preform for forming a structural assembly according to another embodiment of the present invention, including weld joints having nonlinear weld connections.

Each of the individual weld connections 22a, 24a, 26a can be substantially linear as shown in FIGS. 1 and 2. Alternatively, one or more of the weld connections 22a, 24a, 26a can define a nonlinear path, such as a sinusoidal or otherwise curved path, or a zigzag, sawtooth, or otherwise nonlinear path. For example, as shown in FIG. 4A, each of the weld joints 22 includes two substantially linear weld connections 22a and a nonlinear weld connection 22a' defining a sinusoidal curve therebetween. In other embodiments, the weld joints 22, 24, 26 can include other configurations of linear and/or nonlinear weld connections 22a'. For example, each weld joint 22, 24, 26 can include several substantially parallel nonlinear weld connections similar to the sinusoidal weld connections 22a' with or without linear weld connections 22a, 24a, 26a proximate thereto. Further, the linear and/or nonlinear weld connections 22a, 22a' can be partially overlapped. In either case, the use of nonlinear weld connections with or without the use of linear weld connections can increase the stiffness of the resulting structural assembly 10.

The first and second weld joints 22, 24 are disposed to define spaces therebetween so that the preform 40 defines the cells 30 that are subsequently expanded to form the structural assembly 10. In addition, elongate members 51 such as cables or wires can be disposed between the structural members 12, 14, 16 in the cells 30 before the structural members 12, 14, 16 are welded. The elongate members 51 can extend in a continuous longitudinal direction between the structural members 12, 14, 16, and the elongate members 51 have a width smaller than the width of the cells 30 so that the elongate members 51 maintain a space or passage 53 along the length of the cells 30 as shown in FIGS. 3 and 4. The elongate members 51 are preferably formed of a material having sufficient strength and heat resistance to maintain the passages 53 despite the forces and heat associated with friction stir welding or otherwise joining of the structural members 12, 14, 16. For example, the elongate cables 51 can be formed of stainless steel wire, typically with a diameter of between about 0.05 inches and 0.25 inches. Generally, larger diameter wire can be used for thicker structural members 12, 14, 16 or configurations requiring increased force therebetween during welding. Smaller diameter wire can be used if the weld joints 22, 24, 26 are to be formed close together so that the structural members 12, 14, 16 are not excessively deformed by the presence of the elongate members 51 therebetween. Oxide films can also be provided on the surfaces of the structural members 12, 14, 16 adjacent the weld joints 22, 24, 26, as described in U.S. Pat. No. 6,537,682 to Colligan, the entirety of which is incorporated herein by reference.

The preform 40, also referred to as a forming pack, can be expanded and formed to a desired configuration of the structural assembly 10. In this regard, fluid connections 42 can be provided for supplying and, optionally, venting fluid from the cells 30 of the preform 40 and the structurally assembly 10. As shown in FIG. 2, the face members 12, 14 can be larger than the core member 16, e.g., so that the face members 12, 14 extend beyond the core member 16 to form an overhang region 44. The first and second weld joints 22, 24 can be formed co-extensive with the core member 16 so that the cells 30 end proximate to the overhang region 44, and the cells 30 are therefore open to a space 46 defined between the face members 12, 14 in the overhang region 44. The third weld joint 26, which connects the face members 12, 14 and the core member 16 can extend around the periphery 28 of the preform 40 to close the space 46. The fluid connections 42 extend through the third weld joint 26, or the fluid connections 42 can be connected to the preform 40 at gaps provided in the third weld joint 26 so that the connections 42 are fluidly connected to the space 46 within the preform 40. In other embodiments, fluid connections can be provided on opposite sides of the preform 40, such as in the case of a large preform 40 defining long cells 30, so that the fluid is provided to opposite sides of the preform 40.

Figure 5:
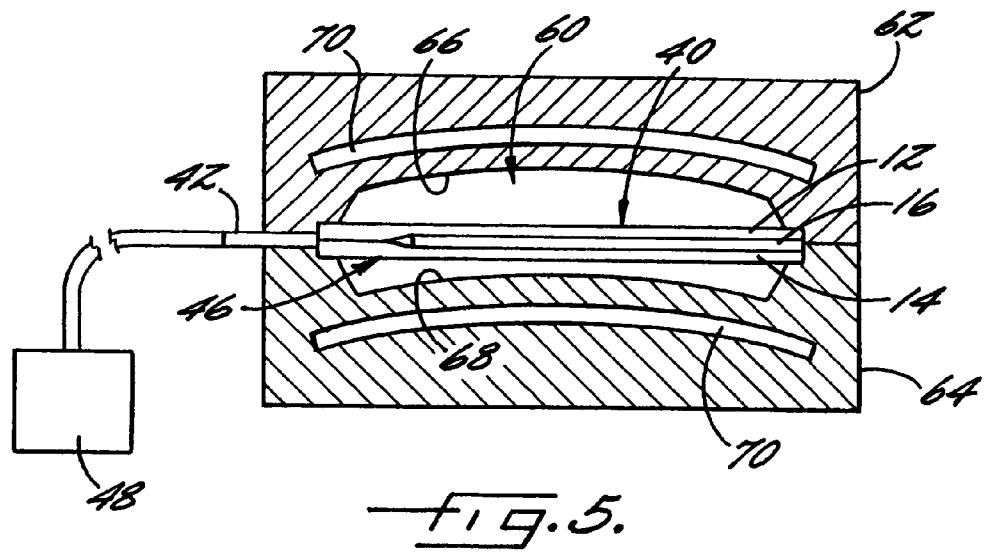
FIG. 5 is a section view illustrating the preform of FIG. 4 configured in a die cavity for expanding.
Figure 6:
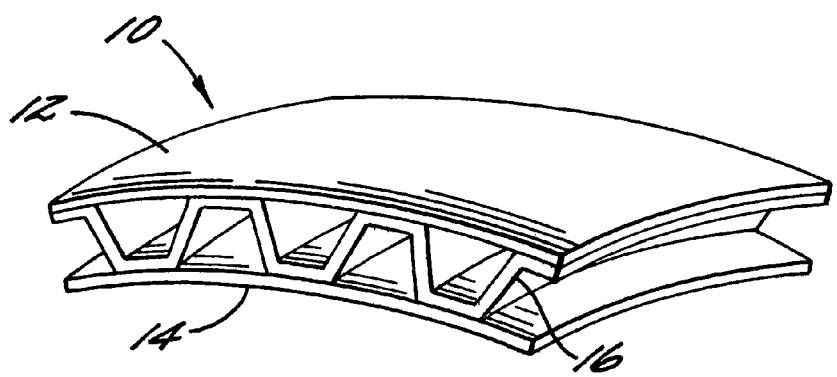
FIG. 6 is a perspective view of a structural assembly formed from the preform of FIG. 4 according to another embodiment of the present invention.

The preform 40 can be expanded by providing a pressurized fluid to the cells 30, thereby inflating the cells 30 to a desired configuration. For example, as shown in FIG. 5, the preform 40 can be positioned in a die cavity 60 defined by corresponding dies 62, 64, and the fluid connections 42 can be connected to a pressurized fluid source 48. The fluid source 48 can be configured to provide a gas, such as an inert gas at a pressure sufficient for inflating the cells 30. The gas can enter the passages 53, which are maintained by the elongate members 51, and the gas then expands the passages 53 to form the cells 30. The die cavity 60 can be defined by contoured surfaces of the dies 66, 68, which correspond to a desired contour of the structural assembly 10. For example, the contoured surfaces 66, 68 of the dies 62, 64 can define curves, angles, and the like. Further, the dies 62, 64 can define complex curvatures, i.e., contours having more than one axis of curvature, such that the structural members 10 formed in the die cavity 60 define correspondingly complex curvatures. For example, the preform 40 can be expanded in the die cavity 60 shown in FIG. 5 to form the structural assembly 10 of FIG. 6, which includes face members 12, 14 that are curved about multiple axes of rotation. As shown in FIG. 6, the structural assembly 10 can be trimmed after forming, and the elongate members 51 can be removed from the cells 30 of the structural assembly 10. With the opposite ends of the assembly 10 trimmed as shown in FIG. 6, the cells 30 provide open passages that can be used, e.g., to circulate liquids or gas. Alternatively, the assembly 10 can be left untrimmed after forming, and the elongate members 51 can be part of the finished product. The elongate members 51 can be attached to the other members 12, 14, 16 of the structural assembly 10 by the peripheral weld joint 26.

According to one embodiment of the present invention, the preform 40 is superplastically formed to form the structural assembly 10. As is known in the art, superplastic forming can be performed by heating the preform 40 to a superplastic forming temperature and subjecting the preform 40 to a pressure differential, i.e., in this case, a relatively high pressure within the cells 30 of the preform 40 and a low pressure in the die cavity 60 outside the preform 40. Apparatuses and methods for superplastic forming are described in U.S. Pat. No. 5,420,400 to Matsen; U.S. Pat. No. 5,994,666 to Buldhaupt, et al.; U.S. Pat. No. 4,811,890 to Dowling, et al.; and U.S. Pat. No. 4,181,000 to Hamilton, et al., each of which is incorporated herein in its entirety by reference. In some cases, the pressure differential can be 400 psi or higher.

The preform 40 can be heated, e.g., to a temperature sufficient for superplastic forming, by an induction heater that induces a current in one or more susceptors 70 in thermal communication with the preform 40. The susceptors 70, which can be disposed in the dies 62, 64, can be configured to uniformly heat the preform 40 to a desired temperature. Such induction heating apparatuses and methods are described in U.S. Pat. No. 4,622,445 to Matsen and U.S. Pat. Nos. 6,566,635 and 6,180,932 to Matsen, et al., each of which is incorporated herein in its entirety by reference.

The preform 40 can alternatively be inflated or otherwise formed without a high temperature superplastic forming process. Instead, the preform 40 can be stretch formed at a relatively cool temperature, requiring no heating or heating only to a temperature below the superplastic forming temperature, i.e., cold stretch forming. For example, preforms 40 constructed of various aluminum alloys, such as Al 5083, can be stretch formed without first providing substantial heating to the preforms 40. Thus, preforms 40 formed of these aluminum alloys or other stretch-formable materials can be inflated in the die cavity 60 as described above without the use of the induction heater or other type of heater. The stretch forming of the preform 40 can result in cold working, thereby improving the strength or other material characteristics of the preform 40. Gas at pressures up to about 1000 psi, and typically between about 400 psi and 500 psi, can be used to cold stretch form the preform 40.

For those preforms 40 that are heated in the die cavity 60 during forming, the resulting expanded structural assemblies 10 are preferably cooled before being removed from the die cavity 60. For example, preforms 40 that are heated and superplastically formed in the die cavity 60 to form the structural assembly 10 can be quenched in the die cavity 60. Quenching can be performed by circulating a quenching fluid through the die cavity 60. The quenching fluid can be a liquid or a gas, such as cool air. The quenching fluid can be circulated through the expanded structural assembly 10, e.g., into one or more of the gas connections 42, through the cells 30 of the assembly 10, and out of the assembly 10 through one or more of the gas connections 42. The gas connections 42 can be provided on opposite ends of the structural assembly 10 for quenching, so that the quenching fluid can be delivered into the assembly 10 at one end thereof and released from the assembly 10 at the opposite end of the assembly 10. In addition, the die cavity 60 can be opened, i.e., by lifting the first die 62 or lowering the second die 64, so that air or other fluid can contact the outside of the structural assembly 10, thereby further cooling the assembly 10. The quenching fluid can be provided at a temperature that is sufficiently cool for quenching the hot structural assembly 10 and cooling the assembly 10 to a temperature at which the assembly 10 can be removed from the die cavity 60. Further cooling can be performed after the structural assembly 10 is removed from the die cavity 60, e.g., by circulating a fluid through the cells 30 of the assembly 10 and/or circulating a fluid outside the structural assembly 10.

Other material processing operations can also be performed on the structural assembly 10, including additional heat treatment operations. For example, the assembly 10 can be aged by increasing the temperature of the assembly 10 according to a predetermined temperature schedule, e.g., by heating the assembly 10 to an aging temperature of about 250° F. and maintaining the assembly 10 at that temperature for a predetermined duration. Aging and other heat treatment operations can be performed while the assembly 10 is still in the die cavity 60 or after the assembly 10 has been removed therefrom.

For those preforms 40 that are cold stretched or otherwise formed at low temperatures, the resulting expanded structural assembly 10 can be removed from the die cavity 60 immediately after forming. Alternatively, material processing operations such as an aging operation can be performed on the assembly 10 while the assembly is still in the die cavity 60.

Figure 7:
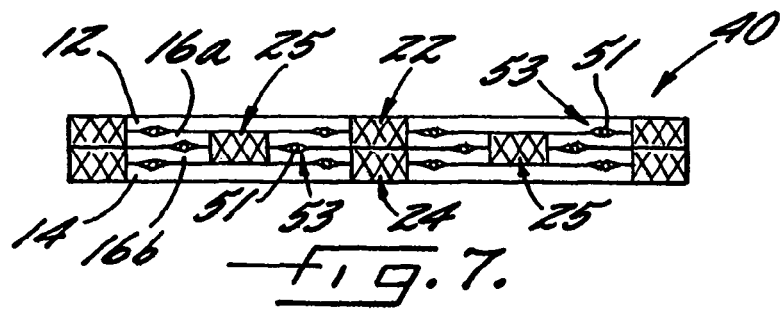
FIG. 7 is a section view of a preform for forming a structural assembly according to another embodiment of the present invention.
Figure 8:
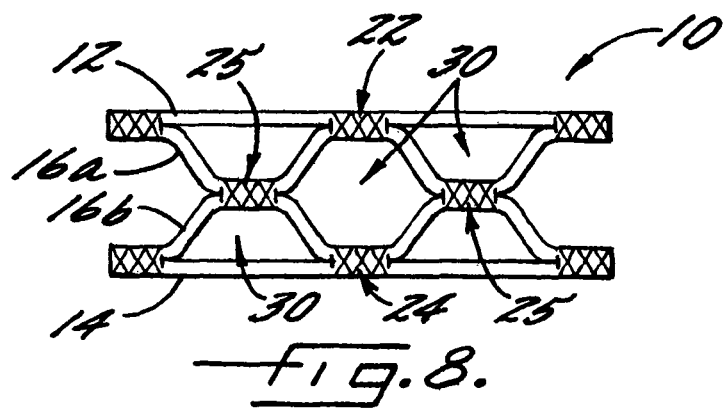
FIG. 8 is an elevation view of the structural assembly formed from the preform of FIG. 7.

FIG. 7 illustrates a preform 40 that includes two core members 16a, 16b disposed between the face members 12, 14. The cells 30 between the face members 12, 14 and core members 16a, 16b can be inflated or otherwise expanded to form the structural assembly 10, as shown in FIG. 8. The elongate members 51 can also be disposed between the structural members 12, 14, 16a, 16b as the members 12, 14, 16a, 16b are stacked to maintain the passages 53 along the length of the cells 30, and the elongate member 51 can be removed from the cells 30 after forming, as shown in FIG. 8. The preform 40 can be produced by first stacking the first and second core members 16a, 16b and forming friction stir weld joints 25 that extend through the core members 25. The first and second structural members 12, 14 can then be disposed on the first and second sides 18, 20 of the core members 16a, 16b. The first structural member 12 can be welded to the first core member 16a by forming partially penetrating friction stir weld joints 22 that extend through the first structural member 12 and through at least a portion of the first core member 16a. The second structural member 14 can be welded to the second core member 16b by forming partially penetrating friction stir weld joints 24 that extend through the second structural member 14 and through at least a portion of the second core member 16b. Alternatively, the first core member 16a can first be welded to the first face members 12, and the remaining members 14, 16b can then be welded thereto, either individually or in combination. In any case, the weld joints 22, 24, 25 connect the adjacent structural members 12, 14, 16a, 16b so that the cells 30 are defined between the weld joints 22, 24, 25, and so that the cells 30 are defined between adjacent structural members 12, 14, 16a, 16b, which can be deformed by inflation of the cells 30. Each of the weld joints 22, 24, 25 can be a multiple-pass joint that includes any number of parallel adjacent weld connections. The face members 12, 14 can extend beyond one or more edges of the core members 16a, 16b to define an overhang region 44 for defining the space 46 that communicates with the cells 30, and the peripheral area 28 of the members 12, 14, 16a, 16b can be joined with a weld joint (not shown) that extends therethrough to seal the space 46 and cells 30.

Figure 9:
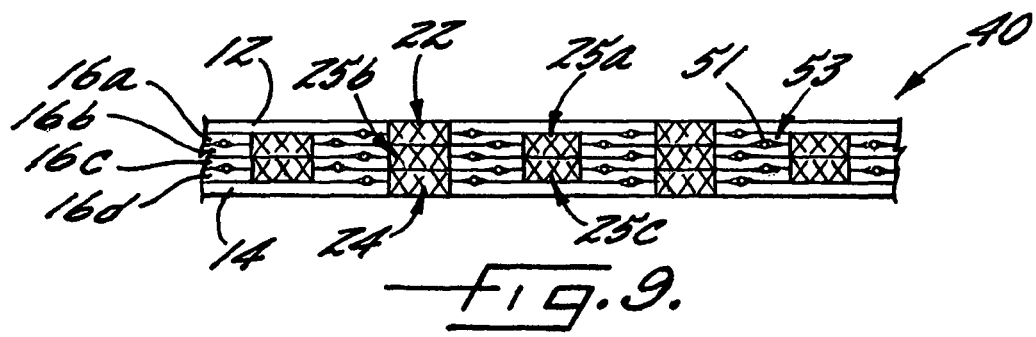
FIG. 9 is a section view of a preform for forming a structural assembly according to yet another embodiment of the present invention.
Figure 10:
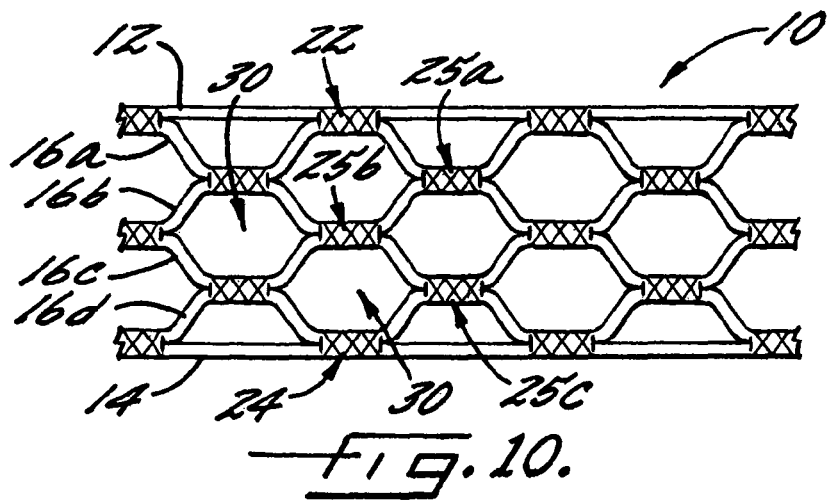
FIG. 10 is an elevation view of the structural assembly formed from the preform of FIG. 9.

It is appreciated that any number of structural members 12, 14, 16 can be welded to form a preform according to the present invention. Further, in some embodiments, the weld joints 22, 24, 25 can be disposed only partially through the preform 40, e.g., between one of the face members 12, 14 and a portion of the core members 16 or between successively stacked core members 16. For example, FIGS. 9 and 10 illustrate a preform 40 and an expanded structural assembly 10 formed therefrom. The preform 40 includes four core members 16a, 16b, 16c, 16d disposed between the face members 12, 14. Friction stir weld joints 22, 24, 25a, 25b, 25c connect the core members 16a, 16b, 16c, 16d and the face members 12, 14. During formation of the preform 40, the core members 16a, 16b, 16c, 16d can be formed independently of the face members 12, 14 and then connected to the face members 12, 14. Alternatively, the preform 40 can be formed by stacking the structural members 12, 14, 16a, 16b, 16c, 16d in a different operational order, e.g., by successively stacking the core members 16a, 16b, 16c, 16d onto the first face member 12 and then connecting the second face member 14 to the core members 16a, 16b, 16c, 16d. The resulting structural assembly 10 can provide an increased stiffness relative to other honeycomb structural assemblies that are formed of fewer numbers of members. In particular, the six-sheet configuration of FIG. 10 can be expanded to a total height that is greater than the height of the assembly of FIG. 8. An increase in the total height of a structural assembly generally increases the stiffness of the assembly, and therefore an expanded assembly having six structural members as shown in FIG. 10 can generally be stiffer than an assembly having four structural members as shown in FIG. 8. Thus, panels having multiple core members, such as the structural assembly 10 shown in FIG. 10, can be used in such applications where increased stiffness is required, such as in transport vehicles, building construction, and rocket fuselages. In some cases, the assembly 10 of FIG. 10 can provide a crash barrier for a vehicle or other structure that absorbs significant energy during deformation.

Advantageously, the friction welding of the joints 22, 24, 25a, 25b, 25c can refine the grain structure and improve the elongation properties of the structural members 12, 14, 16a, 16b, 16c, 16d so that the members 12, 14, 16a, 16b, 16c, 16d can be plastically deformed by cold stretch forming, superplastic forming, and the like. Further, as described above in connection with FIGS. 2 and 3, each of the friction weld joints 22, 24, 25a, 25b, 25c can include multiple adjacent weld connections so that the adjacent weld connections define a combined multiple-pass weld joint that is wider than each of the individual weld connections. As shown in FIGS. 7 and 8, the combined width of the adjacent weld joints 22, 24, 25a, 25b, 25c can be about as wide as one side of the cells 30. By providing multiple adjacent weld connections, the bond between the structural members 12, 14, 16a, 16b, 16c, 16d achieved by the weld joints 22, 24, 25a, 25b, 25c can be made stronger and the risk of deformation of the face members 12, 14 can be reduced. For example, if the face members 12, 14 are provided in a relatively planar configuration, and stretch formed in the die cavity 30, the core members 16a, 16b, 16c, 16d can exert a tensile force between the face members 12, 14 while the preform 40 is being deformed. However, by forming wide weld joints, the tensile force associated with the core members 16a, 16b, 16c, 16d can be distributed over a larger portion of the face members 12, 14, thereby reducing the likelihood of undesirable local deformation of the face members 12, 14 occurring near the joints 22, 24, 25a, 25b, 25c.

The elongate members 51 can be removed from the cells after forming, as shown in FIGS. 8 and 10. The expanded structural assembly 10 can also be cut, machined, or otherwise trimmed to a desired shape and size. Various features can be provided on the structural assembly 10. For example, holes can be provided in the face members 12, 14 for receiving connector devices such as rivets, bolts, screws, and the like. Additionally, plates or other members can be welded or otherwise connected to the face members 12, 14 at regions where high stresses are anticipated, such as near holes in, or edges of, the face members 12, 14, where the structural assembly 10 is to be connected to other members, and other regions.

The structural members 12, 14, 16 of the present invention can be formed of a variety of materials, including various metals and metal alloys. Preferably, the preforms 40 and, hence, the structural assemblies 10 are formed of materials that can be friction welded to form the friction weld joints 22, 24, 25 before superplastic or stretch forming of the preforms 40. Materials that can be friction stir welded and formed according to the present invention include, but are not limited to, aluminum, aluminum alloys, nickel alloys, and stainless steel. Further, the structural members 12, 14, 16 can be formed of so called "unweldable" materials, i.e., materials that are characterized by a high thermal conductivity and that typically quickly dissipate heat away from the weld joints, materials that exhibit cracking along the weld joint as a result of stresses caused by thermal expansion, and/or materials that include constituents that are typically outgassed during fusion welding. Unweldable materials produce relatively weak weld joints when welded using conventional fusion welding processes and, thus, are for the most part not used in the construction of superplastically formed assemblies. Such unweldable materials can include certain alloys of aluminum and aluminum-lithium. Advantageously, many of these materials possess special corrosion, fatigue, strength, or ductility characteristics that are desired in certain applications. Further, the structural members 12, 14, 16 can be formed of similar or dissimilar materials, which are typically difficult or impossible to weld using conventional fusion or resistance welding processes.

Figure 11:
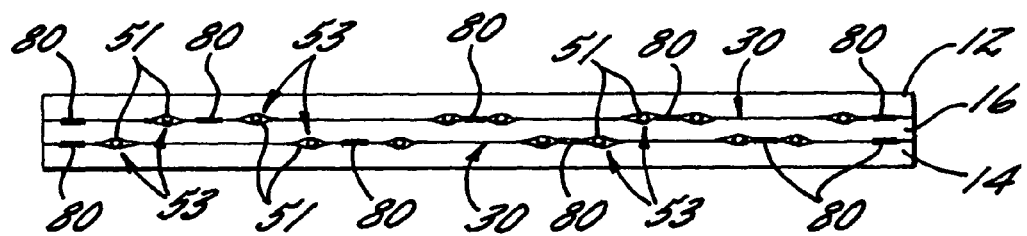
FIG. 11 is a section view of a preform for forming a structural assembly according to still another embodiment of the present invention, the preform having a braze material disposed between the structural members.

In some embodiments, a braze material can also be provided between the structural members before the members are welded and formed. The braze material can then be melted, e.g., during the forming process, so that the braze material substantially fills any space between the structural members proximate to the weld joints 22, 24, 26. For example, as shown in FIG. 11, the braze material can be disposed as foil in longitudinal strips 80 between the structural members 12, 14, 16 at the locations of the weld joints 22, 24, 26. Subsequently, the strips 80 of the braze material is melted. For example, the strips 80 of the braze material can be melted in combination with the forming operation. In particular, the braze material can have a melting temperature that is less than the maximum temperature of the forming operation. In one embodiment, the forming operation includes a temperature increase at or near the end of the forming operation, so that the strips 80 are melted after the structural members 12, 14, 16 have been formed to the desired shape. The braze material preferably has a melting temperature that is lower than the melting temperature of the structural members 12, 14, 16. For example, the braze material can be an alloy including one or more of aluminum, brass, copper, or zinc. Preferably, the braze material substantially fills the space between the adjacent structural members proximate to the weld joints 22, 24, 26. For example, the braze material can fill the spaces between the adjacent weld connections 22a, 24a, 26a. The braze material can increase the strength and stiffness of the resulting structural assembly 10 as well as increasing the assembly's resistance to fatigue and corrosion.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for manufacturing a friction welded, expanded structural assembly, the method comprising:
   positioning at least two structural members in a stacked relationship;
   disposing at least one elongate member between the structural members, each elongate member extending along a path of a corresponding cell of the structural assembly and defining a passage therealong;
   friction stir welding and thereby joining the structural members in a predetermined pattern to form a preform defining at least one cell therebetween; and
   inflating the cell with a pressurized fluid to expand the preform to a desired configuration of the structural assembly, wherein inflating the cell comprises inflating at least that portion of the cell that surrounds and is proximate to the respective elongate member to a size larger than the respective elongate member while the elongate member remains within the corresponding cell such that the elongate member maintains contact with only one of the structural members with the contact being along a single line of contact,
   said friction stir welding step comprising forming a plurality of multiple-pass friction stir weld joints having at least two adjacent friction stir weld joints between adjacent cells of the preform such that the adjacent friction stir weld joints of each multiple-pass friction stir weld joint have a combined width greater than a width of each of the adjacent friction stir weld joints taken individually, said step of forming the plurality of multiple-pass friction stir weld joints comprising forming each of a plurality of the adjacent friction stir weld joints of a multiple-pass friction stir weld joint so as to at least partially penetrate at least two of the structural members such that the adjacent friction stir weld joints join at least two of the structural members.

2. A method according to claim 1 wherein said positioning step comprises positioning at least one core member between first and second face members such that the first and second face members are directed toward opposite surfaces of the core member, and wherein said friction stir welding step comprises friction stir welding the first face member to the core member with a friction stir welding tool that penetrates the first face member and at least a portion of the core member such that the welding tool does not penetrate the second face member and friction stir welding the second face member to the core member with a friction stir welding tool that penetrates the second face member and a portion of the core member such that the tool does not penetrate the first face member.

3. A method according to claim 2 wherein said friction stir welding step comprises friction stir welding a plurality of the core members such that the core members are joined by friction stir weld joints disposed entirely within the core members, and wherein said inflating step comprises inflating the first and second face members positioned on opposite sides of the friction stir weld joints disposed entirely within the core members such that the first and second face members are inflated away from the core members.

4. A method according to claim 2 wherein said inflating step comprises expanding a plurality of cells, at least some of the cells of the preform being inflated to six-sided shapes extending in a longitudinal direction such that the cells of the structural assembly define a honeycomb configuration.

5. A method according to claim 2 further comprising welding a periphery of the preform to define at least one fluid inlet in fluid connection with the cells.

6. A method according to claim 5 wherein said second welding step comprises friction stir welding the periphery of the preform with a rotating friction stir welding tool that at least partially penetrates each of the first and second face members.

7. A method according to claim 1 wherein said friction stir welding step comprises forming the adjacent friction stir weld joints with a combined width greater than a thickness of each of the structural members.

8. A method according to claim 1 wherein said inflating step comprises positioning the preform in a die cavity defining a contour surface corresponding to a desired contour of the structural assembly and expanding the cells to urge the structural members outward against the die cavity.

9. A method according to claim 8 further comprising providing at least one die defining the die cavity, the contour surface defining a complex curve such that said inflating step comprises forming the structural assembly to define the complex curve of the contour surface.

10. A method according to claim 1 further comprising heating the preform to a superplastic forming temperature such that the preform is superplastically formed during said inflating step.

11. A method according to claim 8 further comprising circulating a coolant fluid through the structural assembly after said inflating step while the structural assembly remains within the die cavity, thereby quenching the structural assembly.

12. A method according to claim 1 wherein said inflating step comprises cold stretch forming the preform.

13. A method according to claim 1 further comprising providing the structural members, at least one of the structural members comprising aluminum.

14. A method according to claim 1 further comprising providing a braze material between the structural members and melting the braze material to substantially seal the weld joints formed by said friction stir welding step.

15. A method according to claim 1 wherein disposing at least one elongate member comprises disposing at least one elongate member having a width smaller than a width of the respective cell such that the elongate member maintains the passage between the structural members generally along the path of the cell.

16. A method according to claim 1 further comprising removing the at least one elongate member from the structural assembly following inflation of the cell.

17. A method according to claim 1 wherein at least one of the friction stir weld joints of a multiple-pass friction weld joint has a nonlinear configuration and at least another of the friction stir weld joints has a linear configuration, wherein the friction stir weld joints having the nonlinear configuration and the linear configuration define therebetween portions of the structural members that remain unwelded.

* * * * *